(12) United States Patent
Solimano et al.

(10) Patent No.: US 8,509,934 B2
(45) Date of Patent: Aug. 13, 2013

(54) METHOD FOR MANAGING AND CONTROLLING MANUFACTURING PROCESSES PLANNED BY AN ENTERPRISE RESOURCE PLANNING AND PRODUCED BY A PLANT FLOOR

(75) Inventors: Marco Solimano, Genoa (IT); Massimo Peretti, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 984 days.

(21) Appl. No.: 12/570,672

(22) Filed: Sep. 30, 2009

(65) Prior Publication Data

US 2010/0082141 A1 Apr. 1, 2010

(30) Foreign Application Priority Data

Sep. 30, 2008 (EP) .................................... 08017167
Dec. 2, 2008 (EP) .................................... 08170438

(51) Int. Cl.
*G06F 19/00* (2006.01)
*G05B 11/01* (2006.01)
*G05B 13/02* (2006.01)
*G05D 23/00* (2006.01)

(52) U.S. Cl.
USPC .................. 700/108; 700/9; 700/11; 700/19; 700/28; 700/32; 700/91; 700/117; 700/159; 700/169; 700/244; 700/275

(58) Field of Classification Search
USPC .................. 700/9, 11, 19, 28, 32, 91, 95, 97, 700/108, 117, 159, 169, 244, 275
See application file for complete search history.

(56) References Cited

U.S. PATENT DOCUMENTS

| | | | | |
|---|---|---|---|---|
| 4,958,292 A | * | 9/1990 | Kaneko et al. | 700/106 |
| 5,398,336 A | * | 3/1995 | Tantry et al. | 1/1 |
| 5,923,363 A | * | 7/1999 | Elberbaum | 348/156 |
| 5,950,006 A | * | 9/1999 | Crater et al. | 717/140 |
| 6,603,842 B2 | * | 8/2003 | Elberbaum | 379/106.01 |
| 7,461,012 B2 | * | 12/2008 | Elberbaum | 705/27.1 |
| 7,543,276 B2 | * | 6/2009 | Pfander et al. | 717/125 |

(Continued)

OTHER PUBLICATIONS

Klostermeyer et al., "Padbadis—An Agent Based Flexible Manufacturing Concept", IEEE, 2003, p. 286-293.*

(Continued)

*Primary Examiner* — Kavita Padmanabhan
*Assistant Examiner* — Thomas Stevens
(74) *Attorney, Agent, or Firm* — Laurence A. Greenberg; Werner H. Stemer; Ralph E. Locher

(57) ABSTRACT

A Manufacturing Executing System (MES) implements a planned manufacturing process and controls the corresponding production at the plant floor in a method and in a system for managing and controlling manufacturing processes planned by an Enterprise Resource Planning (ERP) and produced by the plant floor. The method includes defining sequential process segments. Each sequential process segment includes a plurality of actions to be performed at a plant floor level. The method includes the execution of a software tool including the steps of activating a sequential process segment and sequentially executing the respective actions. The method further includes defining state machines including a plurality of states and state transitions corresponding to actions to be performed at plant floor. A state manager tool is executed to define the state machines. A software tool is activated by the state manager tool to execute the state transitions of the state machine.

6 Claims, 4 Drawing Sheets

(56) References Cited

U.S. PATENT DOCUMENTS

| | | | |
|---|---|---|---|
| 7,639,907 B2* | 12/2009 | Elberbaum | 385/24 |
| 2004/0162626 A1* | 8/2004 | Farchmin et al. | 700/96 |
| 2004/0225402 A1* | 11/2004 | Chang et al. | 700/121 |
| 2006/0069541 A1* | 3/2006 | Walacavage et al. | 703/22 |
| 2009/0121842 A1* | 5/2009 | Elberbaum | 340/10.5 |

OTHER PUBLICATIONS

Lee et al., "Simulation-based Planning and Control: From Shop Floor to Top Floor", Elsevier, 2007, p. 85-98.*

* cited by examiner

METHOD FOR MANAGING AND CONTROLLING MANUFACTURING PROCESSES PLANNED BY AN ENTERPRISE RESOURCE PLANNING AND PRODUCED BY A PLANT FLOOR

CROSS-REFERENCE TO RELATED APPLICATION

This application claims the priority, under 35 U.S.C. §119, of European application EP 08017167.1, filed Sep. 30, 2008, and European application EP 08170438.9, filed Dec. 2, 2008; the prior applications are herewith incorporated by reference in their entirety.

BACKGROUND OF THE INVENTION

Field of the Invention

The present invention relates to a method for managing and controlling manufacturing processes planned by an Enterprise Resource Planning (ERP) and produced by a plant floor. A Manufacturing Executing System (MES) implements the planned manufacturing process and controls the corresponding production at plant floor.

More particularly, the present invention relates to a method of the type described above and includes defining sequential process segments. Each sequential process segment includes a plurality of actions to be performed at a plant floor level. The method includes executing a software tool including the steps of activating a sequential process segment and sequentially executing the corresponding plurality of actions.

The present invention further relates to a system for managing and controlling manufacturing processes planned by an Enterprise Resource Planning (ERP) and produced by a plant floor, wherein a Manufacturing Executing System (MES) implements the planned manufacturing process and controls the corresponding production at the plant floor.

The method for managing and controlling manufacturing processes planned by an Enterprise Resource Planning (ERP) and produced by a plant floor includes a Manufacturing Executing System (MES) for implementing the planned manufacturing processes and for controlling the corresponding production steps at the plant floor.

In particular, the Enterprise Resource Planning (ERP) is a system including hardware devices and corresponding software applications for planning the business resources of an enterprise, i.e. material provisions, human resource managements, purchasing, orders, profits, finance, inventory controls, customer managements, etceteras. The term "plant floor" has been used to indicate a system supporting the control of single machines involved in manufacturing processes, for example, by measuring the number of pieces produced per hour by each machine or the functioning parameters thereof, the quality of the pieces produced, and so on.

As schematically represented in FIG. 1, the MES is an intermediate layer providing computing machines and software tools 1-$n$ between the ERP upper layer and the plant floor lower layer. The software tools 1-$n$ include a software tool for production order management, such as, a production order manager application 1, which receives requests of production from the ERP. The software tools 1—also include a software tool for production modeling 2 that supports the phases of selecting and managing the resources that are involved in the manufacturing processes, i.e. employees, machines and materials, in order to realize a planned manufacturing process within required time constraints.

MES is based on the ISA (International Standard Association) standard S95 which defines how software tools 1-$n$ may implement the production at the plant floor level and how the software tools 1-$n$ communicate with the plant floor level. More particularly, as represented in FIG. 2, ISA standard S95 is substantially based on a manufacturing process represented by a plurality of sequential process segments PS1, PS2, PS3, PS4, wherein each sequential process segment includes a plurality of actions A1, . . . An to be performed sequentially at the plant floor level.

An execution of the MES software tool described above includes the management of the manufacturing process by activating a sequential process segment PS1 and sequentially executing the corresponding plurality of actions A1, . . . An.

More particularly, in order to complete a manufacturing process, the software tool for production order management, such as, a production order manager application 1, substantially repeats the steps of activating and waiting for the end of a plurality of sequential process segments, for a plurality of process segments. In this case, a plurality of software tools, which correspond to respective sequential process segments, is executed for the duration of the corresponding sequential process segment.

Advantageously, MES works very well to support manufacturing processes including sequential process segments which may be executed synchronously and continuously, for example, in industrial production processes or batch industries which are implemented by well described algorithms or sequential steps, such as, in a food producing process of the type involving the following steps: "fill mixer with a first material", "fill mixer with a second material", "mix materials for 10 minutes", and "discharge", wherein the first material and the second material as well as the mixer are available.

However, MES does not work very well to support manufacturing processes including some processes which may be stopped for long periods, for example, due to the lack of a resource, machine, material or personnel required to perform it. This occurs especially in discrete manufacturing processes used, for example, in automotive factories, as is schematically represented in FIG. 2.

In FIG. 2, the manufacturing process of assembling a car engine with the external structure of the car is schematically represented using a sequence of four sequential process segments. The first segment PS1 provides the engine assembling, the second segment PS2 provides the external structure assembling, the third segment PS3 provides the coloring of the external structure that has already assembled, and the last segment PS4 provides the mounting of the assembled engine with the external structure that has already been colored.

Each sequential process segment PS1-P4 includes a plurality of actions A1, A2, A3, A4, A5, . . . An which are executed sequentially, i.e. action An cannot be executed until all the previous actions are terminated.

In this case, a first software tool for production order management, such as, production order manager application 1, is executed for activating the first action of segment PS1 and it remains in execution until the last action An of the process segment PS1 is ended—even if one action A3 is suspended for a long period. For example, even if some pieces of the engine are not available, because these pieces have not already been ordered or delivered to the plant floor, the software tool corresponding to the first segment PS1 is executed. A second software tool is executed for activating the first action A1 of process segment PS2 and it remains in execution until the last action An of the process segment PS2 is ended. In the same way, a third and a fourth software tool are each executed for activating the first actions A1 of the corresponding sequential process segments PS3 and PS4 and wait for the end of their execution.

Also the second, third and fourth software tools are executed when some actions of the corresponding sequential process segments PS2, PS3, PS4 are suspended, for example, because a door to be assembled in process segment PS2 is not already available and/or a color to be used in process segment PS3 has been used up.

This creates a great load for computing machines executing the software tools, and requires a large number of computing machines to be involved in executing such software tools, especially when the manufacturing process is implemented by a high number of sequential process segments.

In other words, the sequential process segments defined above are applied very well in industrial production processes and in general where process segment executions actually manage actions that are continuously executed, so that the process segment execution cost is largely paid for by the process control benefit.

However, it is not applied very well in discrete manufacturing processing where there is no real process control continuously running during a complete life cycle of some products, but rather a plurality of commands are sent to machines at the plant floor level for producing a lot of products that are then moved to other machines. Moreover, in discrete manufacturing processing, many of the commands are issued manually by personnel rather than automatically with a predetermined order by an on top controller.

In order to support such discrete manufacturing process with sequential process segments continuously running, a lot of "wait for events" should be inserted into each sequential process segment, to control if a following action may be executed or if the production must be suspended until an event occurs. In other words, a plurality of receiving points should be defined, which remain waiting for notifications from other actions regarding the next step to be executed in the sequential process segment.

The situation becomes even worse taking considering that a software tool may be active for a long time, for example, for tens of days, because a sequential process segment has been paused for a long period even if only a portion of the segment has been produced.

A problem in supporting discrete manufacturing processes with sequential process segments is that the execution of the software tool in MES is activated when the corresponding sequential process segment starts and the execution is continued until the last action of the process segment is ended—even if one action is stopped for several days, so that the computing machines executing the corresponding software tool are unnecessarily kept busy even when there is no need for management and control.

SUMMARY OF THE INVENTION

It is therefore an object of the present invention to provide a method for managing and controlling manufacturing processes planned by an Enterprise Resource Planning (ERP) and produced by a plant floor which executes asynchronous production processes. The asynchronous production processes are implemented by a plurality of states and actions that will be performed at the plant floor level. Each action corresponds to a state transition. The method uses a software tool ST which is only activated for executing the actions. In this way, the execution time of the software tool ST is decoupled from the execution time of the overall asynchronous production process. In fact, the software tool is not executed while the asynchronous production process is suspended in a predetermined state, for example, waiting for the material before executing the subsequent actions.

With the foregoing and other objects in mind, there is provided a method for managing and controlling manufacturing processes planned by an Enterprise Resource Planning (ERP) and produced by a plant floor. The method includes defining a plurality of state machines which implement corresponding asynchronous production processes. Each state machine includes a plurality of states and a plurality of state transitions corresponding to actions to be executed at the plant floor. The method further includes executing a state manager tool to define the state machines, and using a software tool, which is activated by the state manager tool, to execute the state transitions.

In accordance with an additional feature of the invention, there is provided, a step for selecting sequential process segments which introduce latency in the planned manufacturing process and a step for replacing the selected sequential process segments with asynchronous production processes including state transitions corresponding to a plurality of actions which substitute the plurality of actions of the replaced sequential process segments.

In accordance with an added feature of the invention, a target state of the state machine is reached starting from different source states depending on the state machine that is defined and the state transitions that are executed by the software tool.

With the foregoing and other objects in mind, there is also provided a system for managing and controlling manufacturing processes planned by an Enterprise Resource Planning and produced by a plant floor. A Manufacturing Executing System implements the planned manufacturing processes and controls the corresponding production at plant floor. The System includes a computing engine further including state machines implementing asynchronous production processes. Each state machine includes a plurality of states and a plurality of state transitions corresponding to actions to be performed by resources at the plant floor. The system further includes a state manager tool for defining the state machines, and a software tool for executing the state transition. The software tool is activated by the state manager tool only for executing a state transition.

Other features which are considered as characteristic for the invention are set forth in the appended claims.

Although the invention is illustrated and described herein as embodied in a method for managing and controlling manufacturing processes planned by an enterprise resource planning and produced by a plant floor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
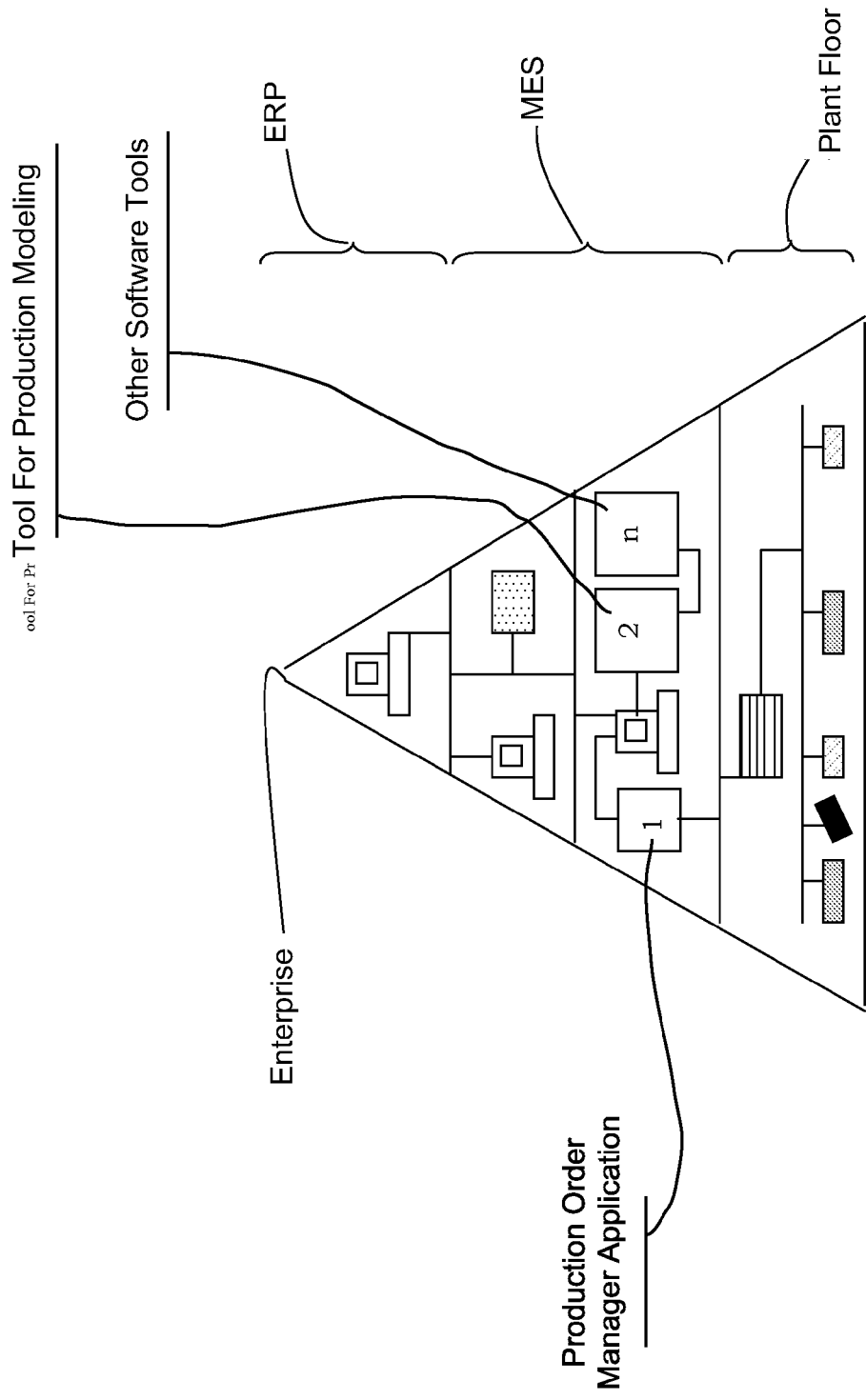
FIG. 1 is a schematic diagram of a prior art method for managing and controlling manufacturing processes.
Figure 2:
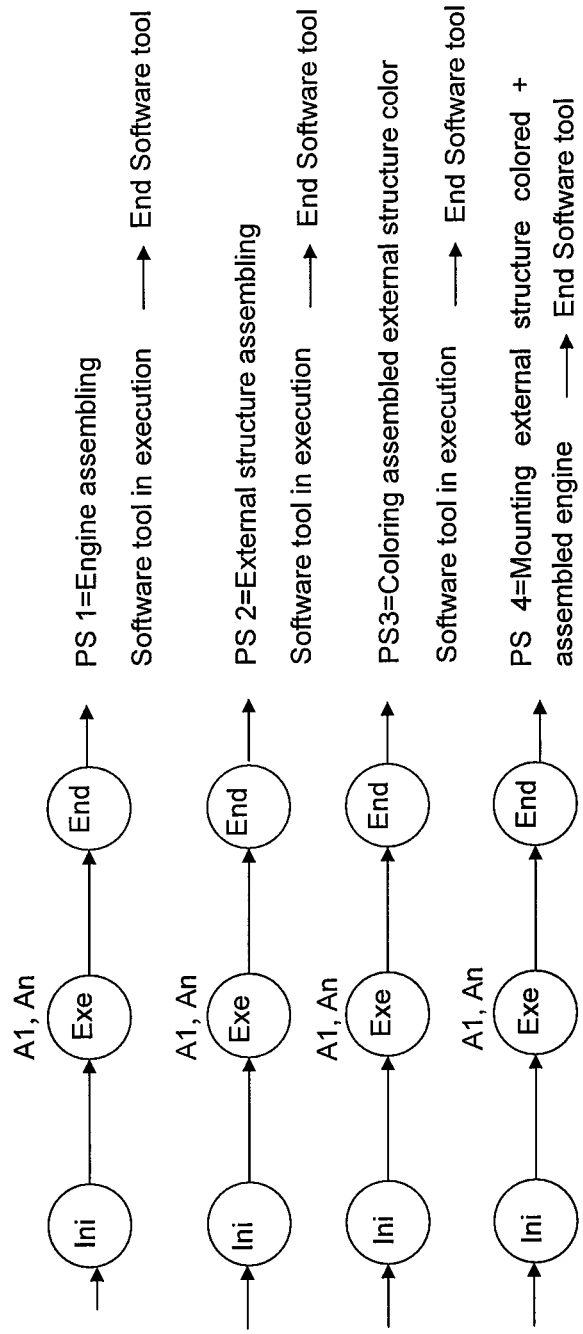
FIG. 2 is a schematic diagram showing the steps of defining sequential process segments for implementing the planned manufacturing process shown in FIG. 1.

Referring now to the figures of the drawing in detail, there is disclosed herein a method for managing and controlling manufacturing processes planned by an Enterprise Resource Planning (ERP) and produced by a plant floor.

The method provides a Manufacturing Executing System (MES) for implementing a planned manufacturing process and for controlling the corresponding production at the plant floor and includes the steps of:

defining sequential process segments PS1, PS2, PS3, PS4, wherein each sequential process segment PS1, PS2, PS3, PS4 includes a plurality of actions A1, An to be performed sequentially at a plant floor level, and executing a software tool ST including the steps of activating a sequential process segment PS1 and sequentially executing the corresponding actions A1, An, until a last action An is completed.

More particularly, a plurality of software tools ST are provided for executing the steps of activating a corresponding sequential process segment PS1, PS2, PS3, PS4 and sequentially executing the respective actions A1, An.

According to the method of the present invention, the Manufacturing Executing System (MES) defines state machines 3 implementing asynchronous production processes OES1, OES2, OES3, OES4, OES5, wherein each state machine includes a plurality of states A, B, C, D, E and a plurality of state transitions A1-A5 corresponding to actions to be performed at the plant floor. More particularly, the method further includes the step of executing a state manager tool whereby the state machines 3 are defined. Both the state manager tool and the software tool ST are stored in computing machines, hereafter also referred to as computing resources, including interfaces for controlling the manufacturing machines at the plant floor.

The software tool ST is activated by the state manager tool and is executed only for the time necessary to execute the state transitions A1-A5, i.e. the corresponding action to be performed at the plant floor.

Advantageously, if a state transition cannot be executed, for example, because the asynchronous process segment is suspended to wait for a material or a mechanical piece that is not available, the software tool ST is not executed and the corresponding computing resources is not loaded.

This advantage is particularly evident when the plant floor includes a great number of producing or manufacturing machines. In this case, a plurality of software tools ST should be executed for activating the asynchronous process segment associated with the manufacturing machines.

However, if one software tool ST is inactive because the corresponding asynchronous process segment is suspended, it may be activated to execute a state transition for another asynchronous process segment.

Advantageously, the execution time of the software tool ST is decoupled by the execution time of the asynchronous process segment because it is activated only for the state transition, i.e. it does not matter how much time the asynchronous process segment is suspended in a predetermined state.

Figure 3:
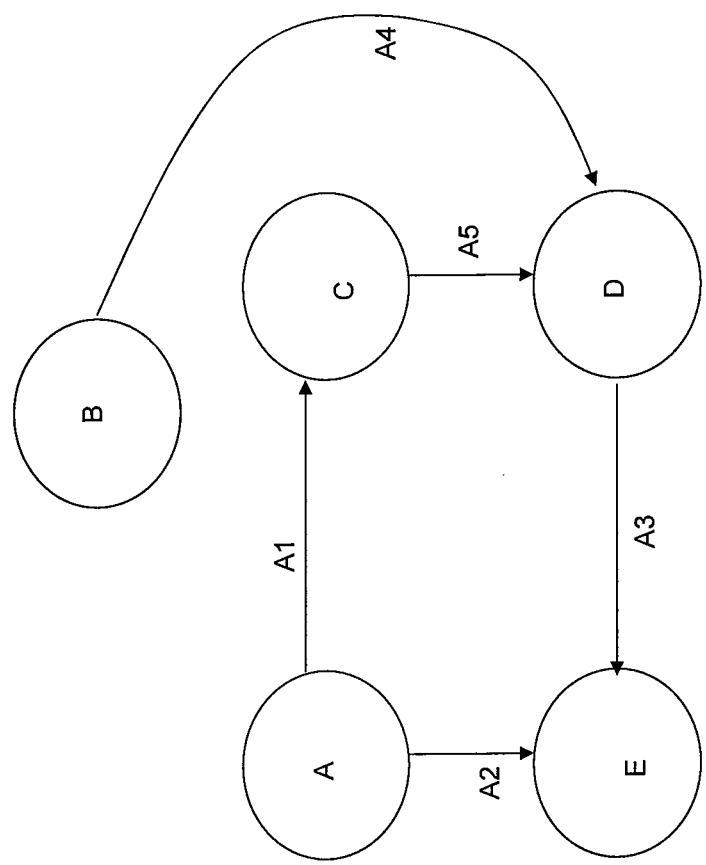
FIG. 3 is a schematic diagram showing the steps of defining a state machine for implementing asynchronous production processes.

FIG. 3 schematically represents a state machine 3 for implementing an asynchronous process segment, including states A, B, C, D, E and state transitions A1-A5, wherein A1 is the transition from state A to state C, A2 is the transition from state A to state E, A3 is the transition from state D to state E, A4 is the transition from state B to state D and A5 is the transition from state C to state D.

An end state E is defined for the state machine 3, corresponding to an end of the asynchronous process segment implemented by the state machine 3. As schematically represented in FIG. 3, the end state E may be reached from more than one state, i.e. from state A, via the transition A2, and from state D, via transition A3. Accordingly, the execution of all of the actions A1-A5 is not required to terminate the asynchronous process segment. To terminate the asynchronous process segment, it is only required to execute a state transition A2 or A3 which terminates in the end state E of the state machine 3.

Advantageously, according to the present invention, the end state E, corresponding to the completion of the asynchronous production process, does not depend on a plurality of actions to be sequentially executed before the end state E.

A target state D of the state machine 3 may be reached starting from different source states B or C depending on the state machine that is defined and the state transitions that are executed by the software tool ST.

One or more asynchronous production processes OES1, OES2 may be also advantageously executed together by corresponding software tools ST executed in the same computing resource or in separate computing resources. According to the present invention, a discrete manufacturing process already implemented by sequential process segments may be modified in order to replace some or all of the sequential process segments with asynchronous production processes.

More particularly, the inventive method further includes a step for selecting the sequential process segments PS1, PS2, PS3, PS4 that introduce latency in the planned manufacturing process and a step for replacing the selected sequential process segments PS1, PS2, PS3, PS4 with asynchronous production processes OES1, OES2, OES3, OES4, OES5 including state transitions corresponding to actions A1, An that substantially substitute the plurality of actions A1, An of the replaced sequential process segments PS1, PS2, PS3, PS4. Such steps of selecting and replacing are performed by the software tool ST.

Advantageously, the computing machine in which the software tool ST runs is activated only for executing the state transitions in the state machine 3, while it is not active when the asynchronous production process remains in a predetermined state. The state manager tool further provides for the execution of a production order manager application 1 receiving, as input, the planned manufacturing process and producing, as output, the states of the state machine 3. A further software module STM executes the step of defining the sequential process segments PS1, PS2, PS3, PS4 which may be used to perform strictly sequential and not concurring applications.

Preferably, the production order manager application 1 and the software module STM are as defined in the SIMATIC IT specification of the same applicant and correspond to the modules respectively indicated as POM and PM therein. The software module STM provides the step of defining the asynchronous production processes OES1, OES2, OES3, OES4, OES5 and the state transitions between the plurality of states of the state machines associated therewith.

The state transitions are activated by recalling the software module ST from the state manager tool with parameters including the source and target states, an identifier of the resources performing the asynchronous production processes OES1, OES2, OES3, OES4, OES5 at the plant floor, process parameters for the resources, and a transition name of each state transition.

The asynchronous production processes at the plant floor are also referenced in the following description as "on event segments", in order to emphasize that the corresponding state transitions are asynchronously activated by the software tool ST when an event occurs and to emphasize their difference from the sequential process segments that are executed synchronously and that are continuously monitored by the software tool ST.

More particularly, according to the present invention, the software tool ST is executed only when it is activated by the state manager tool because an event occurs, for activating a state transition, i.e. it is substantially decoupled by the execution of the asynchronous production process.

Moreover, at the end of execution of the actions corresponding to the state transition, the software tool ST is not limited to activating predetermined sequential actions, but it may activate any transition in accordance with the state machine 3 or it may wait for another event without activating another transition. For example, it may wait for an event associated with an action of the operator.

The step of defining state machines 3 described above is realized by instantiating objects from a new class "OnEvent-Segment" defined in the software module STM, which is saved in a standard database and by associating the instantiated objects with states defined in the production order manager application 1. More particularly, such association may be executed by a user of the software module STM.

The method further provides a "RefuseTransition" command which is executed to roll back a transition into a source state, after a state transition to a target state has been required from the software tool ST. The RefuseTransition command is included as an "if" instruction inside the asynchronous production process and is associated with a failure of the process, so that the state machine 3 is rolled back into the source state when the "if" instruction is executed, or proceeds in the target state otherwise.

Figure 4:
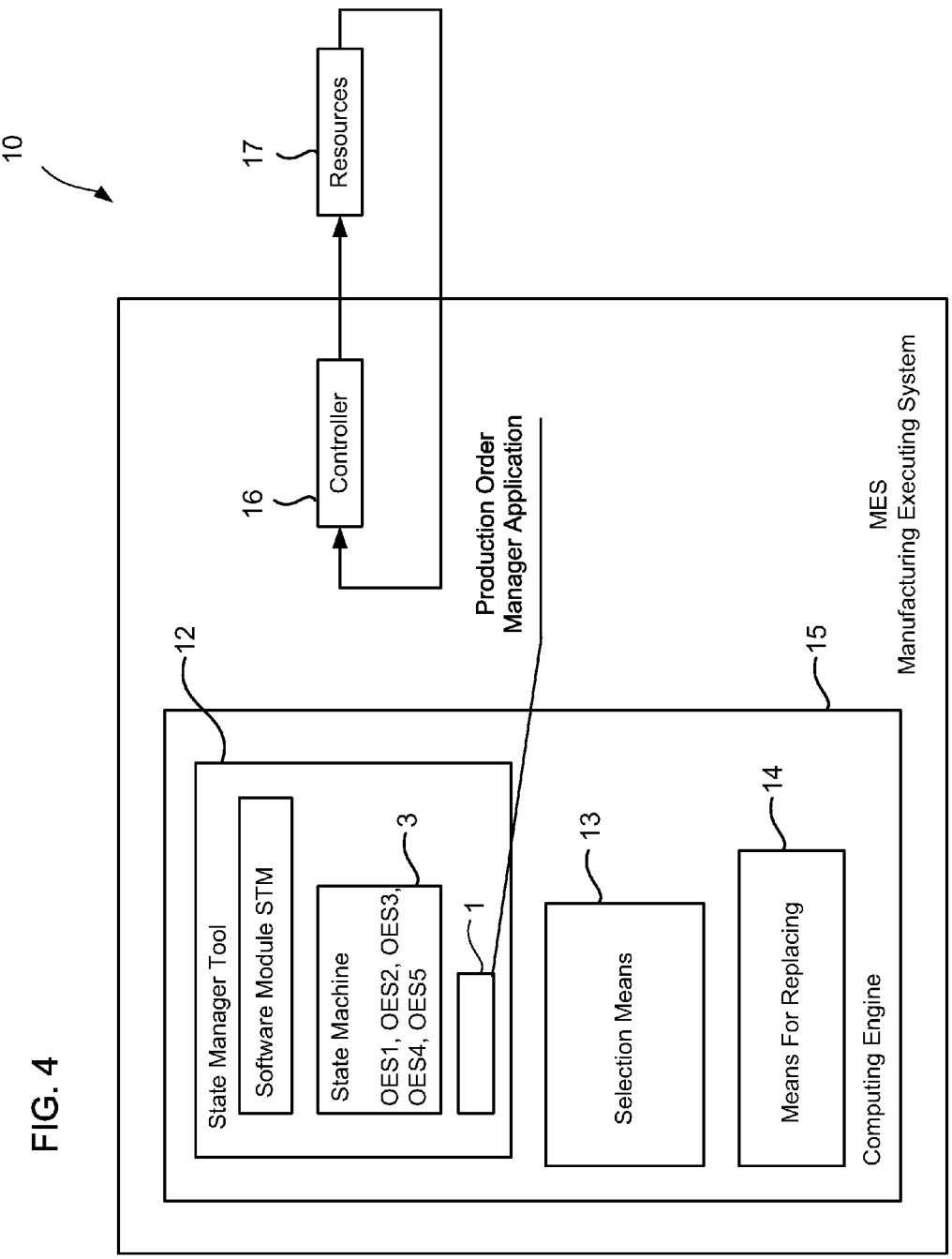
FIG. 4 is a schematic diagram of a system for managing and controlling manufacturing processes.

The present invention further relates to a system for managing and controlling manufacturing processes 10 planned by an Enterprise Resource Planning (ERP) and produced by a plant floor, wherein a Manufacturing Executing System (MES) implements the planned manufacturing process and controls the corresponding production at plant floor. FIG. 4 shows a schematic diagram of one possible example of a system for managing and controlling manufacturing processes 10.

The Manufacturing Executing System (MES) includes a computing engine 15 including a definition of sequential process segments PS1, PS2, PS3, PS4, wherein each sequential process segment PS1, PS2, PS3, PS4 includes a plurality of actions A1, An to be performed by resources at a plant floor level, and a controller 16 including an output connected to an input of the resources 17 and an input connected to the output of the resources 17, for sending an activation signal to a predetermined resource and sequentially executing the corresponding actions A1, An, until a last action An is completed.

According to the present invention, the computing engine 15 further includes state machine 3 that implements asynchronous production processes OES1, OES2, OES3, OES4, OES5, including a plurality of states A, B, C, D, E, and state transitions A1-A5, corresponding to actions A1, An to be performed by the resources. The software tool ST is active only for executing state transitions in the state machine 3.

The system includes a computing engine 15 that stores a state manager tool 12 that defines the state machines 3. The system also includes one or more computing machines, also referred to as computing resources, including interfaces for controlling manufacturing machines at the plant floor and a software tool ST for executing the state transitions A1-A5 of the state machine 3.

More particularly, the software tool ST is activated by the state manager tool 12 and is executed only for the time necessary to execute the state transition, i.e. the corresponding action to be performed at the plant floor. The computer engine 15 further includes selection means 13 for selecting sequential process segments PS1, PS2, PS3, PS4 that introduce latency in the planned manufacturing process. The computer engine 15 further includes means 14 for replacing the selected sequential process segments PS1, PS2, PS3, PS4 with asynchronous production processes OES1, OES2, OES3, OES4, OES5, which include state transitions A1, An that correspond to the plurality of actions A1, An of the replaced sequential process segments PS1, PS2, PS3, PS4.

The state machine 3 includes a target state D connected to one or more source states B, C by corresponding state transitions A4, A5 so that a target state D may be reached after the execution of different actions. The state machine 3 further includes a predetermined end state E corresponding to an end of the asynchronous production process.

The state manager tool 12 also includes a production order manager application 1 that receives the planned manufacturing process as input and produces the states of the state machine 3 as output. The state manager tool 12 also includes a further software module STM for defining the sequential process segments PS1, PS2, PS3, PS4 which may be used to perform strictly sequential and non-concurring applications.

Preferably, the production order manager application 1 and the software module STM are as defined in the SIMATIC IT specification of the same applicant and correspond to the modules respectively indicated as POM and PM therein.

The software module STM further includes the definition of the asynchronous production processes OES1, OES2, OES3, OES4, OES5 and the state transitions between the plurality of states of the state machines associated therewith.

The state manager tool includes a procedure call for recalling the software tool ST in order to execute the state transitions of asynchronous production processes OES1, OES2, OES3, OES4, OES5. The procedure call includes parameters which include the source and target states, an identifier of resources performing the asynchronous production process OES1, OES2, OES3, OES4, OES5 at the plant floor, process parameters for the resources, and a transition name of the state transition.

The software tool ST includes a command for refusing a state transition and to roll it back into a source state, after a state transition to the target state has been required from the state manager tool and the actions associated therewith cannot be executed.

Advantageously, the inventive method and system serve to support manufacturing processes with asynchronous production processes that are managed and controlled by a software tool in MES which is executed only for activating state transitions when an event occurs. In this way, the computing machine is not kept busy by running such a software tool during the execution of the asynchronous production processes or their suspension, i.e. when there is no need for management and control. The method and the system further and advantageously activate state transitions in any order provided by the state machine that implements the asynchronous production processes in order to keep the computing machine busy running the software tool only for activating a transition, when an event occurs.

Advantageously, the computing machine executing the software tool that activates the state transitions is not unduly burdened in monitoring a predetermined sequence of sequential process segments that are potentially paused or stopped because it implements the manufacturing process by asynchronously activating state transitions. Thus, advantageously according to the invention, there is no need to define "wait for event" steps dedicated to receiving custom signals and to put them in logic because such wait-for-events are managed by the system itself.

The invention claimed is:

1. A method for managing and controlling a planned manufacturing process planned by an Enterprise Resource Planning and produced by a plant floor, wherein a Manufacturing Executing System implements the planned manufacturing process and controls a corresponding production at the plant floor, the method which comprises:

defining a plurality of sequential process segments, wherein each of the plurality of sequential process segments includes a plurality of actions to be performed at a plant floor level;

in a computing machine, executing a software tool including steps of activating a sequential process segment and sequentially executing respective ones of the plurality of actions;

defining state machines implementing corresponding asynchronous production processes including a plurality of states and state transitions corresponding to the plurality of actions to be performed at the plant floor level;

executing a state manager tool to perform the step of defining the state machines;

activating the software tool with a state manager tool in order to execute the state transitions of the state machines;

selecting ones of the plurality of sequential process segments that introduce latency in the planned manufacturing process; and replacing the selected ones of the plurality of sequential process segments with asynchronous production processes including state transitions corresponding to actions which substantially substitute the plurality of actions of replaced sequential process segments;

wherein the software tool enables a step for refusing to execute a state transition and for rolling back into a source state after a state transition to a target state has been required from the state manager tool and a corresponding action cannot be executed.

2. A method for managing and controlling a planned manufacturing process planned by an Enterprise Resource Planning and produced by a plant floor, wherein a Manufacturing Executing System implements the planned manufacturing process and controls a corresponding production at the plant floor, the method which comprises:

defining a plurality of sequential process segments, wherein each of the plurality of sequential process segments includes a plurality of actions to be performed at a plant floor level;

in a computing machine, executing a software tool including steps of activating a sequential process segment and sequentially executing respective ones of the plurality of actions;

defining state machines implementing corresponding asynchronous production processes including a plurality of states and state transitions corresponding to the plurality of actions to be performed at the plant floor level;

executing a state manager tool to perform the step of defining the state machines;

activating the software tool with a state manager tool in order to execute the state transitions of the state machines; and reaching a target state of one of the state machines starting from different source states depending on a definition of the one of the state machines and on the state transitions that are executed by the software tool;

wherein the software tool enables a step for refusing to execute a state transition and for rolling back into a source state after state transition to a target state has been required from the state manager tool and a corresponding action cannot be executed.

3. The method according to claim 2, which further comprises:

completing the asynchronous production process when a predetermined end state of the one of the state machines is reached.

4. A method for managing and controlling a planned manufacturing process planned by an Enterprise Resource Planning and produced by a plant floor, wherein a Manufacturing Executing System implements the planned manufacturing process and controls a corresponding production at the plant floor, the method which comprises:

defining a plurality of sequential process segments, wherein each of the plurality of sequential process segments includes a plurality of actions to be performed at a plant floor level;

in a computing machine, executing a software tool including steps of activating a sequential process segment and sequentially executing respective ones of the plurality of actions;

defining state machines implementing corresponding asynchronous production processes including a plurality of states and state transitions corresponding to the plurality of actions to be performed at the plant floor level;

executing a state manager tool to perform the step of defining the state machines;

activating the software tool with a state manager tool in order to execute the state transitions of the state machines;

providing the planned manufacturing process as input to a production order manager application; and executing the production order manager application to output the plurality of states of the state machine;

wherein the software tool enables a step for refusing to execute a state transition and for rolling back into a source state after a state transition to a target state has been required from the state manager tool and a corresponding action cannot be executed.

5. The method according to claim 4, which further comprises:

using a software module to define the plurality of sequential process segments, to define the asynchronous production processes, and to define the state transitions between the plurality of states.

6. The method according to claim 5, which further comprises:

recalling the software tool from the state manager tool to activate the asynchronous production processes with parameters including source and target states, an identifier of resources performing the asynchronous production process at the plant floor, a plurality of process parameters for the resources, and a transition name of a state transition.

* * * * *